(12) United States Patent
Cai et al.

(10) Patent No.: US 6,890,990 B2
(45) Date of Patent: May 10, 2005

(54) CO-AGENTS FOR THE PREPARATION OF THERMOPLASTIC ELASTOMERIC BLENDS OF RUBBER AND POLYOLEFINS

(75) Inventors: Kevin Cai, Arlington, TX (US); Howard Colvin, Arlington, TX (US); Charles G. Reid, Southlake, TX (US); Hoan Tran, Arlington, TX (US)

(73) Assignee: Solvay Engineered Polymers, Inc., Grand Prairie, TX (US)

( * ) Notice: Subject to any disclaimer, the term of this patent is extended or adjusted under 35 U.S.C. 154(b) by 69 days.

(21) Appl. No.: 10/448,301

(22) Filed: May 30, 2003

(65) Prior Publication Data

US 2004/0242779 A1 Dec. 2, 2004

(51) Int. Cl.[7] .............................. C08F 8/00; C08L 9/00; C08L 33/02; C08L 35/02; C08L 45/00
(52) U.S. Cl. ................. 525/191; 525/193; 525/194; 525/216; 525/222; 525/232; 525/240; 525/241
(58) Field of Search ............................. 525/191, 193, 525/194, 216, 222, 232, 240, 241

(56) References Cited

U.S. PATENT DOCUMENTS

| | | | |
|---|---|---|---|
| 3,037,954 A | 6/1962 | Gessler et al. | |
| 3,203,937 A | 8/1965 | Breslow et al. | |
| 3,806,558 A | 4/1974 | Fischer | |
| 4,108,947 A | 8/1978 | Kimura et al. | |
| 4,130,535 A | 12/1978 | Coran et al. | |
| 4,311,628 A | 1/1982 | Abdou-Sabet et al. | |
| 4,696,986 A | 9/1987 | Halasa et al. | 526/181 |
| 4,948,840 A | 8/1990 | Berta | 525/193 |
| 5,650,468 A | 7/1997 | Vandervijver et al. | 525/285 |
| 5,932,659 A * | 8/1999 | Bambara et al. | 525/240 |
| 6,087,431 A | 7/2000 | Uchida et al. | 524/490 |
| 6,140,434 A | 10/2000 | Halasa et al. | 526/174 |
| 6,201,080 B1 | 3/2001 | Luo et al. | 526/139 |
| 6,207,746 B1 | 3/2001 | Uchida et al. | 524/528 |
| 6,310,140 B1 * | 10/2001 | Raetzsch et al. | 525/191 |
| 6,433,089 B1 | 8/2002 | Nishihara et al. | 525/191 |
| 6,548,600 B2 * | 4/2003 | Walton | 252/191 |

OTHER PUBLICATIONS

R. Drake et al., "Some fundamental considerations in the use of coagents in peroxide curable elastomers", ACS Rubber Division Meeting, Paper No. 5 (Oct. 1994).

* cited by examiner

Primary Examiner—Nathan M. Nutter
(74) Attorney, Agent, or Firm—Winston & Strawn LLP

(57) ABSTRACT

A thermoplastic elastomer with increased oil resistance and decreased compression set compared to conventionally cured thermoplastic elastomers may be made from a dynamically vulcanized blend of propylene resin and ethylene/alpha-olefin/non-conjugated diene elastomers via a curing system containing a free radical initiator, a first co-agent including diene-containing polymers with a 1,2-vinyl content greater than 50% by weight, and a second co-agent including multifunctional acrylates containing at least two acrylate groups, multifunctional maleimides containing at least two imide groups, or mixtures of both, where the elastomer gel content in the modified blend is at least 97%.

23 Claims, No Drawings

CO-AGENTS FOR THE PREPARATION OF THERMOPLASTIC ELASTOMERIC BLENDS OF RUBBER AND POLYOLEFINS

TECHNICAL FIELD

This invention relates to thermoplastic elastomer compositions including blends of propylene resins and ethylene/alpha-olefin/non-conjugated diene elastomers that are dynamically vulcanized via a curing system containing a free radical initiator and at least two co-agents. Reaction mixtures, articles made therefrom, and methods of dynamically vulcanizing are also included.

BACKGROUND OF THE INVENTION

Thermoplastic elastomers formed from blends of cured rubber and polyolefins are known in the art. The structure of such materials is in the form of a matrix containing a plastic component with discrete domains of a partially or fully cured elastomeric component embedded therein. Olefin-based thermoplastic elastomers, with the structure thus described, have the advantage of being able to undergo plastic flow above the softening point of the polyolefin, and yet behave like a cured elastomer below the softening point. Thus, the materials exhibit thermoplasticity (i.e., flowing at elevated temperature under processing conditions) while also exhibiting rubber-like elasticity (i.e., recovering a substantial amount of deformation when a deforming force is removed).

Dynamic vulcanization is a process whereby the elastomeric portion of the thermoplastic elastomer is cured by heating the blend in the presence of a curative while shearing the blend to form a thermoplastic vulcanizate (TPV). Different curing methods that may be used to partially or fully cure the rubber during dynamic vulcanization include sulfur-, peroxide- and phenolic-based systems.

The extent of cure (i.e., partial or full) of the elastomeric or rubber phase is an important factor in the ultimate properties of the final composite, such that lower oil swell and higher ultimate tensile strength are observed at high states of cure, as taught in U.S. Pat. No. 4,130,535. In other words, a blend containing a fully cured elastomeric phase has improved physical properties as compared to uncured or partially cured blends. Such fully cured vulcanizates are processable as thermoplastics although they are crosslinked to a point where the rubber portions are almost or entirely insoluble in the usual solvents. The processability of a fully cured thermoplastic vulcanizate (TPV) is in direct contrast to thermoset compositions, which retain dimensional integrity at service temperatures of 200° C. or above.

Many of the commercial TPV applications use the phenolic resin cure system as disclosed in, for example, U.S. Pat. No. 4,311,628. The thermoplastic elastomers made with this vulcanization system were shown to have better (i.e., lower) compression set and oil resistance than equivalent compositions cured with peroxide or with a sulfur-based vulcanization system. Low compression set is important for a number of applications, such as gaskets and seals. Good oil resistance is important in many automotive applications.

The good compression set and oil resistance of phenolic resin cured thermoplastic elastomers, however, has overshadowed the fact that this cure system is not environmentally friendly because of formaldehyde emissions. Additionally, such products have a dark color or yellowness and are sensitive to moisture pick-up due to the phenolic moieties in the crosslinked network.

Dynamic vulcanization using peroxide to prepare thermoplastic elastomers with the elastomeric phase only partially cured was practiced early in the development of the technology. U.S. Pat. No. 3,806,558 discloses that ethylene-propylene-diene terpolymers (EPDM) could be partially cured by dynamic vulcanization in the presence of polypropylene to provide reprocessable materials with good physical properties.

The use of a peroxide curing system, while producing lighter colored products than the phenolic curing system, may cause the degradation of the propylene resin, adversely affecting physical properties of the thermoplastic elastomer. The use of certain co-agents, which may reduce this degradation, is established in the chemical literature. As an example, some fundamental considerations in the use of co-agents in peroxide curable elastomers are shown in R. Drake and J. Labriola, ACS Rubber Division Meeting, Paper No. 5, Fall 1994.

The co-agent functions by reacting with the radicals formed from decomposition of the peroxide to form free radicals on the co-agent molecule, which then mediate the crosslinking reaction. Typically, these co-agent materials contain di- or poly-unsaturation and have a readily extractable hydrogen in the alpha position to the unsaturated bonds. Examples of such materials include trimethylolpropane trimethacrylate (TMPTMA), trimethylolpropane triacrylate (TMPTA), triallylcyanurate (TAC), triallyltrimellitate (TATM), ethyleneglycol dimethacrylate (EGDMA), triallylisocyanate (TAIC) and 1,2-polybutadiene (PBD), which is usually employed as an atactic low molecular weight liquid.

U.S. Pat. No. 4,108,947 discloses a partially cured thermoplastic elastomer composition containing an olefinic rubber and a polyolefin resin and having a cross-linking degree of less than 90% where the curing system is peroxide and a co-agent. The patent further discloses that it is important not to fully crosslink the rubber phase so that poor fluidity can be avoided.

It is also known that certain combinations of co-agents can be used with peroxides. U.S. Pat. No. 4,948,840, for example, discloses a partially cured thermoplastic elastomer containing propylene resin and fully saturated elastomers, along with a curing system containing 1,2-polybutadiene and an organic peroxide. The curing system may further contain certain additional co-agents, such as phenylene-bis-maleimide.

U.S. Pat. No. 6,207,746 discloses a partially cured thermoplastic elastomer containing polypropylene, an ethylene/olefin copolymer and a processing oil, where the ethylene/olefin copolymer is cured with a radical initiator. Although the patent further discloses that co-agents or combination of co-agents may be used, no distinction is drawn between the various types listed as being suitable.

In general, the prior art on peroxide curing teaches that only partially cured TPV blends are of industrial use, since compositions with the extensive crosslinking of fully cured blends exhibit undesirable processing characteristics, including decreased flowability and poor oil dispersion. As a result, the TPV industry also does not have a robust and consistent peroxide cure system to commercially produce fully cured materials with properties that are comparable to the phenolic cured TPV.

It is desired to provide a peroxide cure system to prepare TPV products with performance equal to or better than phenolic cured TPVs, especially in oil resistance and compression set.

SUMMARY OF THE INVENTION

The invention relates to a reactively modified thermoplastic elastomeric blend including at least one propylene resin and at least one ethylene/alpha-olefin/non-conjugated diene elastomer wherein the blend is dynamically vulcanized via a curing system that includes: a free radical initiator, a first co-agent including diene-containing polymers with a 1,2-vinyl content greater than about 50% by weight, and a second co-agent including multifunctional acrylates containing at least two acrylate groups, multifunctional maleimides containing at least two imide groups, or mixtures thereof, wherein the free radical initiator and the co-agents are collectively present in an amount sufficient to provide a gel content of the elastomer of at least 97% and to provide blends of the invention having a shore A durometer hardness of at least 70 with an oil swell of less than about 90% by weight, and blends having a shore A durometer hardness of no greater than 70 with an oil swell of less than about 100% by weight. In a preferred embodiment, the modified blend includes about 10 to 70% by weight propylene resin and about 5 to 60% by weight ethylene/alpha-olefin/non-conjugated diene elastomer.

Preferably, the first co-agent is present in an amount of about 0.1 to 10% by weight of the modified blend. In one embodiment, the first co-agent includes syndiotactic 1,2-polybutadiene, atactic 1,2-polybutadiene, high vinyl solution styrene-butadiene elastomer, or mixtures thereof. In a preferred embodiment, the first co-agent includes syndiotactic 1,2-polybutadiene having a melting point of at least about 60° C.

In another preferred embodiment, the second co-agent is present in an amount of about 0.1 to 10% by weight of the modified blend. In one preferred embodiment, the second co-agent includes trimethylolpropane triacrylate. In another preferred embodiment, the second co-agent includes N,N'-m-phenylene dimaleimide.

In one preferred embodiment, the free radical initiator is present in an amount of about 0.001 to 2% by weight of the modified blend. Preferably, the free radical initiator includes at least one organic peroxide. It is also preferred that the modified blend is essentially free of moisture sensitivity.

In one embodiment, the elastomeric blend further includes about 5 to 65% by weight of at least one extender oil. In yet another embodiment, the elastomeric blend further includes a filler present in an amount of about 0.001 to 20% by weight. In one embodiment, the ethylene/alpha-olefin/non-conjugated diene elastomer includes ethylene/propylene/diene elastomer. In another embodiment, the ethylene/alpha-olefin/non-conjugated diene elastomer without oil has a Mooney viscosity [ML (1+4) @ 125° C.] of at least about 100.

In one embodiment, the elastomeric blend further includes one or more of organic and inorganic pigments, heat stabilizers, antioxidants, ultraviolet absorbers, photostabilizers, flame retardants, antiblocking agents, foaming agents, antistatic agents or antibacterial agents, or any combination thereof.

The invention also relates to an article including the reactively modified blend described herein. Preferably, the blend has a lighter color, less yellowing, or both, as compared to the same blend formed with a phenolic resin cure system, while still having comparable oil swell and compression set. In another embodiment, the blend of the invention has a yellowness index of less than 30.

The invention further relates to a process for preparing a dynamically vulcanized thermoplastic elastomer composition by blending a mixture of at least one polypropylene resin and at least one ethylene/alpha-olefin/non-conjugated diene elastomer at a temperature above the melting point of the at least one polypropylene resin, adding a free radical initiator, at least one co-agent comprising diene-containing polymers with a 1,2-vinyl content greater than about 50% by weight, and at least one co-agent including multifunctional acrylates containing at least two acrylate groups or multifunctional maleimides containing at least two imide groups, and then mixing and shearing the blend sufficiently at a temperature to effect crosslink formation such that the elastomer has a gel content of at least 97%, wherein the free radical initiator and the co-agents are collectively present in an amount sufficient to provide blends of the invention having a shore A durometer hardness of at least 70 with an oil swell of less than about 90% by weight, and blends having a shore A durometer hardness of no greater than 70 with an oil swell of less than about 100% by weight. In one preferred embodiment, the mixing device includes a twin screw extruder.

The invention also relates to a thermoplastic elastomer curing system including a free radical initiator that includes at least one organic peroxide, a first co-agent that includes diene-containing polymers with a 1,2-vinyl content greater than about 50% by weight, and a second co-agent comprising multifunctional acrylates containing at least two acrylate groups, multifunctional maleimides containing at least two imide groups, or mixtures thereof, wherein the curing system includes sufficient amounts of the free radical initiator and the co-agents, when combined with at least one polypropylene resin and at least one additional ethylene-containing elastomer material, to form a reactively modified thermoplastic elastomer blend having a gel content of the elastomer of at least 97%, and to provide blends of the invention having a shore A durometer hardness of at least 70 with an oil swell of less than about 90% by weight, and blends having a shore A durometer hardness of no greater than 70 with an oil swell of less than about 100% by weight.

The invention further encompasses thermoplastic elastomer-based reaction mixtures that include the thermoplastic elastomer curing system described above and at least one propylene resin and at least one ethylene/alpha-olefin/non-conjugated diene elastomer.

DETAILED DESCRIPTION OF THE PREFERRED EMBODIMENTS

It has now been discovered that the proper combination of co-agents allows the selection of the desired physical properties without compromising processability due to extreme crosslinking. The dynamically vulcanized products made using this invention are also aesthetically superior, while reducing or avoiding the yellowing or other discoloration typically experienced with prior art phenolic cured products. In addition, the blends of the invention are essentially free or free of moisture sensitivity and may be processed without drying.

In accordance with this invention, it has now been found that a thermoplastic elastomer composition of a reactively modified blend of one or more propylene resins and one or more ethylene/alpha-olefin/non-conjugated diene elastomers may be dynamically vulcanized via a curing system containing a free radical initiator, a first co-agent of diene-containing polymers with a 1,2-vinyl content greater than 50% by weight, and a second co-agent including multifunctional acrylates containing at least two acrylate groups, multifunctional maleimides containing at least two imide groups, or mixtures of both, such that the elastomer gel content in the final blend is at least 97%.

The "propylene resin" is present in amounts from about 10 to 70% by weight, preferably about 11 to 60% by weight, and more preferably about 12 to 55% by weight and is chosen from one or more of the following of homopolymers of propylene, copolymers of at least 60 mole percent of propylene and at least one other $C_2$ to $C_{20}$ alpha-olefins, or mixtures thereof. Preferred alpha-olefins of such copolymers include ethylene, 1-butene, 1-pentene, 1-hexene, methyl-1-butenes, methyl-1-pentenes, 1-octene and 1-decene or combinations thereof.

The copolymer of propylene can include a random or block copolymer. Random copolymers of propylene and alpha-olefins, when used, generally include macromolecular chains in which the monomers are distributed statistically. The propylene content of these random copolymers is generally at least about 70 mole percent and preferably at least about 75 mole percent. The block copolymers can include distinct blocks of variable composition; each block including a homopolymer of propylene and at least one other of the above-mentioned alpha-olefins. Although any suitable copolymerization method is included within the scope of the invention, heterophasic copolymers with propylene blocks are generally obtained by polymerization in a number of consecutive stages in which the different blocks are prepared successively.

The melt flow rate (MFR) of the propylene polymer used in the present invention is preferably in a range from 0.01 to 200 g/10 minutes (load: 2.16 kg at 230° C., according to ASTM D-1238-01). Above 200 g/10 minutes, the heat resistance and mechanical strength of the thermoplastic elastomer composition will tend to be insufficient, whereas below 0.01 g/10 minutes the processability will often be less than desirable. The isotacticity of the propylene homopolymer is typically greater than about 80%, and preferably greater than about 90%.

Exemplary propylene homopolymers or copolymers are commercially available as, for example, PROFAX, ADFLEX AND HIFAX from Basell North America, Inc. of Wilmington, Del., as FORTILENE, ACCTUFF or ACCPRO from British Petroleum Chemicals of Houston, Tex., and as various types of polypropylene homopolymers and copolymers from ExxonMobil Chemicals Company of Houston, Tex., from Borealis A/S from Lydgby, Denmark, from Sunoco Chemicals of Pittsburgh, Pa., and from Dow Chemical Company of Midland, Mich.

The ethylene terpolymer elastomer (ethylene/alpha-olefin/non-conjugated diene) is present from about 5 to 60% by weight, preferably about 6 to 55% and more preferably about 7 to 50% by weight (excluding oil) and is chosen from terpolymers containing from about 40 to 75% by weight ethylene, from about 20 to 60% by weight of a $C_3$ to $C_{20}$ alpha-olefin component, and from about 1% to 11% by weight of non-conjugated diene monomer. The alpha-olefin component includes one or more $C_3$ to $C_{20}$ alpha-olefins, with propylene, 1-butene, 1-hexene, and 1-octene preferred, and propylene being most preferred for use in the ethylene elastomer.

Examples of suitable non-conjugated diene monomers include straight chain, hydrocarbon di-olefin or cylcloalkenyl-substituted alkenes having from 6 to 15 carbon atoms, or combinations thereof. Specific preferred examples include one or more classes or species including (a) straight chain acyclic dienes such as 1,4-hexadiene and 1,6-octadiene; (b) branched chain acyclic dienes such as 5-methyl-1,4-hexadiene; 3,7-dimethyl-1,6-octadiene; 3,7-dimethyl-1,7-octadiene; (c) single ring alicyclic dienes, such as 1,4-cyclohexadiene; 1,5-cyclooctadiene and 1,5-cyclododecadiene; (d) multi-ring alicyclic fused and bridged ring dienes such as tetrahydroindene; methyl-tetrahydroindene; dicyclopentadiene (DCPD); bicyclo-(2.2.1)-hepta-2,5-diene; alkenyl, alkylidene, cycloalkenyl and cycloalkylidene norbornene, such as 5-methylene-2-norbornene (MNB), 5-propenyl-2-norbornene, 5-isopropylidene-2-norbornene, 5-ethylidene-2-norbornene (ENB), 5-(4-cyclopentenyl)-2-norbornene, 5-cyclohexylidene-2-norbornene, and 5-vinyl-2-norbornene (VNB); (e) cycloalkenyi-substituted alkenes, such as allyl cyclohexene, vinyl cyclooctene, allyl cyclodecene, vinyl cyclododecene. Of the non-conjugated dienes typically used, the preferred dienes are dicyclopentadiene, 1,4-hexadiene, 5-methylene-2-norbornene, and 5-ethylidene-2-norbornene, or combinations thereof.

The elastomer without any oil extension typically has a Mooney viscosity (ML 1+4, 125° C.), as measured by ASTM D-1646-00, of at least about 100. Elastomeric terpolymers of ethylene/propylene/diene (EPDM) are preferred. Exemplary elastomers are commercially available as NORDEL from DuPont Dow Elastomers LLC of Wilmington, Del., as VISTALON from ExxonMobil Chemicals of Houston, Tex., as DUTRAL from Polimeri Europa Americas of Houston, Tex., as BUNA EP from Bayer Corporation of Pittsburgh, Pa., as KELTAN from DSM Elastomers America of Baton Rouge, La., or as ROYALENE from Crompton/Uniroyal Chemicals of Middlebury, Conn.

The elastomer curing system contains a free radical initiator combined with at least two co-agents. The free radical initiator should be chosen so that a sufficient amount of radicals are generated to cause full curing of the elastomer during the mixing process. The free radical initiator is present in amounts from about 0.001 to 2% by weight, with about 0.01 to 1% being preferable and about 0.03 to 0.3% being most preferable. Below 0.001% by weight, the crosslinking of the elastomer will typically be insufficient, while above 2%, there will usually be no improvement or too little improvement in physical properties. Typically, the free radical initiator may be organic peroxides or organic azo compounds or any mixtures thereof.

Free radical initiators useful for this invention, preferably one or more organic peroxides, should have a decomposition half-life of greater than about one hour at 120° C. Representative peroxides that are useful are peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane,1,1-bis(t-butylperoxy) cyclododecane, 1,1-bis(t-butylperoxy)cyclohexane, 2,2-bis (t-butylperoxy)octane, n-butyl-4,4-bis(t-butylperoxy) butane, n-butyl-4,4-bis(t-butylperoxy) valerate, etc.; dialkyl peroxides such as di-t-butyl peroxide, dicumyl peroxide, t-butylcumyl peroxide, alpha,alpha'-bis(t-butylperoxy-m-isopropyl)benzene, alpha,alpha'-bis(t-butylperoxy) diisopropylbenzene, 2,5-dimethyl-2,5-bis(t-butylperoxy) hexane, 2,5-dimethyl-2,5-bis(t-butylperoxy)-hexyne-3, etc.; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, m-tolyoyl peroxide, etc.; peroxyesters such as t-butyl peroxyacetate, t-butyl peroxyisobutyrate, t-butylperoxy-2-ethyl hexanoate, t-butyl peroxylaurylate, t-butyl peroxybenzoate, di-t-butyl peroxyisophthalate, 2,5-dimethyl-2,5-di(benzoylperoxy) hexane, t-butyl peroxymaleate, t-butyl peroxyisoproylcarbonate, cumyl peroxyoctate, etc.; hydroperoxides such as t-butyl hydroperoxide, cumene hydroperoxide, diisopropylbenzene hydroperoxide, 2,5- dimethylhexane-2,5-dihydroperoxide, 1,1,3,3-tetramethylbutyl peroxide, etc; or any combination thereof. Among these compounds, dialkyl peroxides with a half life of greater than one hour at 120° C. are preferable. Half life is defined as the time required to reduce the original peroxide concentration by half.

The first co-agent in the elastomer curing system is present in amounts from about 0.1 to 10% by weight, preferably from about 1 to 6% by weight, and most preferably from about 2 to 5% by weight and includes a diene-containing polymer with a 1,2-vinyl content greater than 50%, including atactic 1,2-polybutadiene, syndiotactic 1,2-polybutadiene, high vinyl solution styrene-butadiene elastomers, or mixtures thereof.

Atactic 1,2-polybutadiene, or atactic high vinyl polybutadiene, is typically a viscous liquid having a structure in which the side-chain vinyl groups are located randomly. The preparation of the atactic form generally involves lithium catalyzed polymerization using polar modifiers, such as chelating diamines, oxygenated ether compounds, acetals, and ketals and is described in, for example, U.S. Pat. No. 4,696,986, which is incorporated herein by express reference thereto. The atactic polybutadiene typically has a number average molecular weight (Mn) ranging from about 1,300 to 130,000 and is commercially available in both liquid and solid supported form.

Syndiotactic 1,2-polybutadiene ("PBD") is a semi-crystalline thermoplastic resin that has a stereoregular structure in which the side-chain vinyl groups are located alternately on the opposite sides in relation to the polymeric main chain. The 1,2-polymerization of the butadiene occurs in a head-to-tail fashion and generates a new chiral center. In the syndiotactic polymer, alternate chiral centers have the same configuration. "Semi-crystalline" is herein defined as less than about 90% crystallinity.

The syndiotactic PBD polymer may be prepared by any suitable means including by solution, emulsion, or suspension polymerization using a Ziegler-type catalyst. A variety of coordination catalyst systems such as cobalt-based systems, iron-based catalyst systems, molybdenum-based catalyst systems, and chromium-based catalyst systems can be used as described in U.S. Pat. No. 6,201,080, which is incorporated herein by express reference thereto.

The physical, mechanical, and rheological properties of the syndiotactic PBD form are greatly affected by its melting point, vinyl content, and degree of crystallinity. Melting points as high as 206° C. are possible, depending on the synthetic method used. To maximize the effectiveness in this invention, the syndiotactic content of the PBD polymer should be high enough to provide a crystalline melting point of at least about 60° C., preferably greater than about 70° C. and less than about 205° C. The 1,2-vinyl content is greater than 50%, preferably greater than 75%. The degree of crystallinity of the syndiotactic polybutadiene is less than about 50%, more preferably from about 10 to 45%. The weight average molecular weight of preferred syndiotactic polybutadienes is typically greater than about 100,000. In this invention, syndiotactic polybutadiene has the advantages of being easier to handle and costing less than the atactic high vinyl polybutadiene.

"High vinyl solution styrene-butadiene" elastomers are formed by the copolymerization of a conjugated diolefin monomer, such as 1,3-butadiene, with a vinyl aromatic monomer, such as styrene. The preferred vinyl content of the high vinyl solution styrene-butadiene elastomer is preferably greater than about 60%, more preferably greater than about 70%. The solution polymerization process for making high vinyl styrene-butadiene is described in U.S. Pat. No. 6,140,434, which is hereby incorporated herein by express reference thereto.

The second co-agent includes one or more multifunctional acrylates containing at least two acrylate groups, multifunctional maleimides containing at least two imide groups, or mixtures thereof, and is present in amounts from about 0.1 to 10%, preferably about 0.5 to 7% and most preferably from about 0.7 to 4%. Examples of multifunctional acrylates useful in this invention are trimethylolpropane triacrylate (TMPTA), ethoxylated trimethylolpropane triacrylate, propoxylated trimethylolpropane triacrylate, propoxylated glyceryl triacrylate, pentaerythritol triacrylate, cyclohexane dimethanol diacrylate, pentaerythritol tetraacrylate, ethoxylated pentaerythritol tetraacrylate, and di-trimethylolpropane tetraacrylate. Examples of multifunctional imides which could be used in this invention are phenylene-bis-maleimides such as N,N'-m-phenylene dimaleimide, as well as 4,4'-bismaleimido-diphenylmethane and 3,3'-bismaleimido-diphenylmethane.

Unexpectedly, it was found that the methacrylates such as trimethylolpropane trimethacrylate (TMPTMA) do not effectively improve the compression set and oil swell when used in conjunction with 1,2-polybutadiene as a co-agent in the dynamic vulcanization of EPDM in the presence of polypropylene. This result is in direct contrast to standard thermoset EPDM, where vulcanization of EPDM with TMPTMA/1,2-polybutadiene and a peroxide is well known to decrease compression set and oil swell. Such an anomaly demonstrates that, although the literature on the use of co-agents in thermoset rubbers may be used as a guide for a dynamically vulcanized system, significant differences and unpredictabilities may be encountered. Thus, in one embodiment, the co-agents are at least substantially free of TMPTMA or all methacrylates, and preferably entirely free of TMPTMA, or all methacrylates.

The degree or extent of curing in a thermoplastic vulcanizate is dependent on a variety of factors, including processing time, amount of elastomer curative, and type of curative. A fully cured elastomeric component according to the invention allows the TPV blends to have improved physical properties, with less oil-swell, lower compression set, and higher tensile strength properties, as compared to blends in which the rubber is incompletely or partially cured.

One measure of the extent of cure of the elastomeric component (i.e., measure of crosslinking) is the gel content in the elastomer phase. If the elastomeric phase is partially cured, then only part of the rubber is insoluble in solvents, such as xylene or cyclohexane. If the elastomeric phase is fully cured, at least 97% of the elastomer is insoluble. The improved thermoplastic vulcanizates of the invention are produced by vulcanizing the blends to the extent that at least 97% of the contained EPDM rubber has gelled. This gel content means that the elastomeric phase of the composition contains no more than three percent by weight of rubber extractable in cyclohexane at 23° C., and preferably means that the elastomeric phase of the composition contains less than one percent by weight extractable in cyclohexane at 23° C. In general, the less extractables, the better are the properties and still more preferable are cured elastomers having essentially no extractable rubber (e.g., less than 0.5 weight percent) in cyclohexane at 23 ° C. Fully cured, as referred to herein, means that the degree of curing, in terms of gel content, is at least 97%, preferably at least 99%, in cyclohexane at 23° C.

Gel content reported as percent gel is determined by the procedure of U.S. Pat. No. 3,203,937 and U.S. Pat. No.

4,948,840, which comprises determining the amount of insoluble polymer by soaking a specimen of the composition for 48 hours in cyclohexane at 23° C. and weighing the dried residue, then making suitable corrections based upon knowledge of the composition. Thus, corrected initial and final weights are used by subtracting from the initial weight the weight of the components soluble in cyclohexane, other than the rubber, such as extender oils and other components soluble in cyclohexane. Any insoluble pigments, fillers, etc., are subtracted from both the initial and final weights.

Furthermore, the percent by weight of oil swell is an implicit measure of the degree of curing or crosslinking of the elastomer phase for different thermoplastic vulcanizate (TPV) products with the same extender oil and polypropylene contents. Low or partial crosslinking of elastomer yields higher oil swell values, whereas a thermoplastic elastomer with highly crosslinked dispersed elastomer will have a lower (i.e., more preferred) oil swell. Oil swell is measured according to test method ISO 1817 (1999), using test oil IRM903. Samples of the material compositions are immersed in the oil and held isothermally at 125° C. for 70 hours. Fresh IRM903 oil is used for each test. This temperature and time criterion are used specifically for the automotive industry to ensure that TPV materials can be used in applications where the design temperature is about 100° C. Polyolefin-based thermoplastic elastomers with polyolefin elastomers that are not crosslinked, or only partially crosslinked, exhibit undesirably higher oil swell values, using the test conditions described herein, of 150% to over 1000%. It is only when the polyolefin elastomeric phase is near full crosslinking, with gel content about 97% or higher, that the oil swell value is typically less than about 100% by weight. The present invention is able to produce a non-phenolic resin cured TPV with an oil swell, under the conditions herein described, that is less than 90% by weight for a relatively harder TPV (at least 70 Shore A durometer or greater) and less than 100% by weight for a relatively softer TPV (no greater than 70 Shore A durometer).

Extender oils, or process oils, are often used to reduce any one or more of viscosity, hardness, modulus, and cost of an elastomeric composition. For the extension of most ethylene/alpha-olefin/non-conjugated diene elastomers, oils with a high degree of saturation are typically used. Saturated extender oils with paraffinic content greater than about 40%, when measured with method ASTM D-2140-97, are preferred. Paraffinic content greater than about 50% is more preferred. Viscosity of the extender oil is also important to ensure low volatility during the mixing process. Process oils that are useful for thermoplastic vulcanizate compositions of the invention typically have a kinematic viscosity at 40° C. greater than about 20 centi-Stokes using test method ASTM D-445-01. More preferably, the kinematic viscosity at 40° C. is greater than about 40 centi-Stokes. One of ordinary skill in the art of processing of elastomers will readily recognize the type and amount of oil that would be most beneficial for any given application. The extender oils, when used, are desirably present in an amount of about 4 to 65% by weight, preferably from about 5 to 60% by weight, and most preferably from about 10 to 55% by weight.

The present composition may further contain a filler that typically includes one or more inorganic fillers. Representative inorganic fillers for use in the present invention include, for example, calcium carbonate, magnesium carbonate, silica, carbon black, glass fibers, titanium oxide, clay, mica, talc, barium sulfate, magnesium hydroxide or aluminum hydroxide, or any combination thereof. Typically, the thermoplastic elastomers of this invention will contain from about zero to 20% filler by weight, and when they are present it is usually in an amount from about 0.001% to 20%. Other additives for use in the present invention include, for example, organic and inorganic pigments, heat stabilizers, antioxidants, ultraviolet absorbers, photostabilizers, flame retardants, antiblocking agents, foaming agents, antistatic agents or antibacterial agents, each added in an amount sufficient to provide its desired effect (e.g., a heat stabilizer in an amount sufficient to stabilize the elastomer against heat).

Any suitable method can be used to prepare the blends of the invention. Melt blending is one method for preparing the present invention. Techniques for melt blending of a polymer with additives of all types are known to those of ordinary skill the art and can typically be used with the present invention. Typically, in a melt blending operation useful with the present invention, the individual components of the blend are combined in a mechanical extruder or mixer, and then heated to a temperature sufficient to form a polymer melt and effect the reactive modification. The mechanical mixer can be a continuous or batch mixer. Examples of suitable continuous mixers include single screw extruders, intermeshing co-rotating twin screw extruders such as Coperion Werner & Pfleiderer ZSK extruders, counter-rotating twin screw extruders such as those manufactured by LEISTRITZ, and reciprocating single screw kneaders, such as BUSS co-kneaders. Examples of batch mixers are lateral 2-rotor mixers, such as BANBURY or BOLING mixers.

In a preferred embodiment, the reactively modified blend is prepared by mixing the components in a modular intermeshing co-rotating twin-screw extruder, such as those manufactured by Coperion Werner & Pfleiderer under the trade name of ZSK. Other manufacturers of this type of equipment include co-rotating twin screw extruders from Berstorff, Leistritz, Japanese Steel Works, and others. The screw diameter for this type of mixer may vary from about 25 mm to 300 mm. Commercially viable production rates of the thermoplastic elastomer composition are typically achievable with screw diameters of at least about 70 mm.

The mixing extruder includes a series of sections, or modules, that perform certain mixing functions on the composition. The polymeric components are fed into the initial feed section of the extruder, typically as solid granules at the main feed hopper. The co-agents may also be fed into the main feed hopper, or injected as a liquid into the side of the extruder barrel about 1 to 5 times the distance of the screw diameter downstream of the main feed hopper. The free radical initiator may also be fed as a dry solid, such as liquid peroxide absorbed onto particulate calcium carbonate, or injected as a pure liquid, or in a blend with mineral oil, about 1 to 5 times the distance of the screw diameter downstream from the main feed hopper or downstream of the first mixing section prior to the second mixing section.

Other ingredients, such as fillers, thermal stabilizers, and the like, as described above, may also be fed into the main feed hopper of the mixing extruder as dry powders or liquids. It is preferred that the majority of thermal stabilizers and UV stabilizers be added in a downstream section of the mixer, such as is described in U.S. Pat. No. 5,650,468, which is incorporated herein by express reference thereto.

The components are preferably homogenized with an initial melting and mixing section of the extruder. The polymer melt temperature is raised by a sequence of kneading blocks to just above the highest softening point of the polymer blend. Within this first mixing section of the extruder, it is desirous to maintain the polymer temperature above the melt point of the propylene resin, but below the auto-polymerization temperature of the first or second co-agent or the decomposition temperature of the free radical initiator, within the time frame of the melting process of about 5 to 20 seconds. A melt temperature of about 160° C. to 180° C. is preferred for the first mixing section.

An extending oil may be injected after the first melting section and prior to the primary reaction section. Addition of oil at this point helps to cool the melt temperature and prevent auto-acceleration of the reaction. The melt temperature of the mixture must be maintained at a high enough point during incorporation of the extending oil to inhibit or prevent solidification of the polymer components.

Following the first mixing section, and optional oil-extension section, there is optionally a second mixing section of the extruder that performs kneading and distributive mixing that ensures uniform distribution of the co-agents into the blend of polymers. During this second mixing section, crosslinking of the ethylene/alpha-olefin/non-conjugated diene occurs via a free radical process. The melt temperature in this section should be about 160° C. to 250° C., preferably about 170° C. to 220° C. The residence time within the second mixing section should be at least about 10 seconds, but preferably no more than about 100 seconds, to inhibit or prevent excessive thermal degradation. The preferred residence time in the second mixing section is about 10 seconds to 30 seconds.

A de-gassing section, or de-volatilization zone, is used to remove any gaseous by-products of the crosslinking reaction. There will also be low molecular weight by-products that typically need to be removed from the composition. A melt seal can be used for this purpose at the end of the second mixing section and is accomplished by use of a reverse feed element, or reverse kneading element. Downstream of the melt seal there are standard feed elements to convey material past a vacuum port, which is typically used to remove volatile components.

A second solids addition point may be incorporated into the extrusion mixer, either upstream or downstream of the de-gassing section. This second solids addition point may be used to incorporate stabilization additives, colorants, fillers, and the like.

The final section of the mixing extruder includes melt compression prior to extrusion through a die plate. The melt compression can be accomplished with the co-rotating twin screw extruder, or melt compression can be performed by a de-coupled process, such as a single screw extruder or a melt gear pump. At the end of the compression section, the composition is discharged through a die plate. The product is then cooled in a water bath and optionally, but preferably, pelletized.

Thermoplastic elastomers from this invention are useful in automotive and other articles, such as gaskets, weatherseals, cup holders, and air bag covers. They can also be used in machine parts, electrical parts, cables, hoses, belts and toys.

The term "yellowness index," as used herein, refers to ASTM E 313-00, which describes a standard practice for calculating yellowness and whiteness indices from instrumentally measured color coordinates. For example, the present invention can surprisingly achieve thermoplastic elastomeric blends having reduced yellowness compared to conventional phenolic resin cured TPV materials, which typically have a yellowness index of greater than 30.

The term "substantially free," as used herein, means less than about 5 weight percent, preferably less than about 1 weight percent, and more preferably less than about 0.5 weight percent. In a preferred embodiment, it means less than about 0.1 weight percent. "Completely free" or "free" of a material refers to its complete absence except for any amount present as a trace impurity.

Unless indicated to the contrary, all weight percents are relative to the weight of the total composition.

The term "about," as used herein, should generally be understood to refer to both numbers in a range of numerals. Moreover, all numerical ranges herein should be understood to include each tenth of an integer within the range.

EXAMPLES

This invention is illustrated by the following examples that are merely for the purpose of illustration and are not to be regarded as limiting the scope of the invention or the manner in which it can be practiced.

Materials Used in the Examples:

| | |
|---|---|
| PP | Polypropylene homopolymer; MFR = 0.7 dg/min; isotacticity > 90% |
| Elastomer-1 | Terpolymer of ethylene, propylene and diene monomer; Ethylene content 62%; ethylidene norbornene content ("ENB") 10%; Mooney 43 (ML 1 + 4, 125° C.); paraffinic mineral oil content 50% |
| Elastomer-2 | Terpolymer of ethylene, propylene and diene monomer; Ethylene content 60%; ethylidene norbornene content 4.5%; Mooney 54 (ML 1 + 4, 125° C.); paraffinic mineral oil content 50% |
| Extender oil | Oil with paraffinic content of 70% and kinematic viscosity at 40° C. of 115 centi-Stokes |
| TMPTA | Trimethylolpropane triacrylate |
| TMPTMA | Trimethylolpropane trimethacrylate |
| TMPTMAS | Trimethylolpropane trimethacrylate with Scorch Retarder |
| diTMPTTA | Di-trimethylolpropane Tetraacrylate |
| BMI | N,N'-m-phenylene dimaleimide |
| Peroxide | 2,5-bis(t-butylperoxy)2,5-dimethylhexane |
| LPBD | Liquid poly(1,2-butadiene); dispersed on 30 wt. % synthetic calcium silicate; Mn = 5200 |
| SPBD | Syndiotactic poly(1,2-butadiene); 1,2-vinyl content = 93%; melting point = 105° C.; Mw = 120,000 |
| LV PBD | Solid low vinyl polybutadiene containing 10% vinyl, with 40% cis and 50% trans microstructure |
| $CaCO_3$ | Ground calcium carbonate, mean particle size < 10 microns |
| BLK Color | Black color concentrate, carbon black dispersed in polyolefin carrier |

The following methods were used to determine the properties of the blends:

| | |
|---|---|
| 100% Modulus, MPa | Modulus at 100% elongation, with crosshead velocity of 500 mm/min, measured in mega Pascals, according to ISO 37 Type 1 (1994). |
| UTS, MPa | Ultimate tensile strength, with crosshead velocity of 500 mm/min, measured in mega Pascals, according to ISO 37 Type 1 (1994). |

-continued

| | |
|---|---|
| Ult. Elong. % | Ultimate elongation percent, with crosshead velocity of 500 mm/min, according to ISO 37 Type 1 (1994). |
| Tear Strength, kN/m | Tear strength, with crosshead velocity of 500 mm/min, measured in kN/m, according to ISO 34 Method B (1994). |
| Hardness | Shore A durometer hardness measured at 15 seconds and at room temperature (23° C.), according to ISO 868 (1985). |
| Compression Set, % | Compression set, at 125° C. for 70 hours, measured as a percentage, according to ISO 815 Type A, plied sample (1991). |
| Oil Swell, wt. % | Oil swell, at 125° C. for 70 hours using IRM903 oil, measured in percent by weight, according to ISO 1817 (1999). |
| Gel Content, % | Percent gel content, or crosslinked EPDM, measured by soaking ~1 g of chopped (≦1 mm) pellets in ~100 g of cyclohexane at 23° C. for 48 hours, and weighing the dried residue, then subtracting the weight of the components soluble in cyclohexane, other than rubber, such as extender oil, antioxidant, light stabilizer, etc. The percent gel was calculated as: |

$$\text{Gel Content}(\%) = \frac{[(\text{Initial Wt. of EPDM in sample}) - (\text{Wt. of Extracted EPDM})]}{(\text{Initial Wt. of EPDM in Sample})} \times 100\%$$

| | |
|---|---|
| Shear Viscosity | Apparent viscosity was measured at 230° C. with a capillary die 15 × 1 mm, according to ASTM D-3835 (1996), at an apparent shear rate of 500 sec$^{-1}$. |

The examples shown below were prepared in a Leistritz 27 mm co-rotating twin screw laboratory extruder Model TSE-27 with a length to diameter ratio (L/D) of 52. The solid materials and any liquid co-agent were added in the first feed port while the extender oil, when used, was added downstream during the curing reaction. The extrusion temperature was 205° C., and the extruder speed was 400–450 rpm. All examples were prepared with about 0.2 parts per hundred (pph) of appropriate process and heat stabilizers. Samples from the twin screw extruder were then injection molded into plaques approximately 2.0 mm thick from which ISO 37 (1994) Type 1 dumbbell specimens and ISO 34-1 (1994) 90° angle notched specimens were die cut and then measured for mechanical properties at test speeds of 500 mm/min with a gage length of 25 mm.

TABLE I

| | Example 1 | Example 2 | Comp. Example 1 | Comp. Example 2 | Comp. Example 3 |
|---|---|---|---|---|---|
| Elastomer-2, wt. % | 51.2 | 51.2 | 51.2 | 51.2 | 53.0 |
| PP, wt. % | 20.9 | 20.9 | 20.9 | 20.9 | 20.9 |
| Extender oil, wt. % | 11.0 | 11.0 | 11.0 | 11.0 | 11.0 |
| TMPTA, wt. % | 2.0 | 2.0 | — | — | 2.0 |
| SPBD, wt. % | 2.0 | — | 4.0 | — | — |
| LPBD, wt. % | — | 2.9 | — | 5.7 | — |
| CaCO$_3$, wt. % | 10.7 | 9.8 | 10.7 | 9.0 | 10.9 |
| Peroxide, wt. % | 0.2 | 0.2 | 0.2 | 0.2 | 0.2 |
| BLK Color, wt. % | 2.0 | 2.0 | 2.0 | 2.0 | 2.0 |
| Hardness, Shore A | 77 | 78 | 75 | 78 | 75 |
| Compression Set, % | 56 | 54 | 64 | 62 | 57 |
| Oil Swell, wt. % | 72 | 75 | 113 | 99 | 107 |
| Gel Content, wt. % | >99.5 | >99.5 | >99.5 | >99.5 | — |
| UTS, MPa | 7.9 | 7.9 | 6.7 | 7.3 | 6.3 |
| Ult. Elong. % | 710 | 723 | 873 | 948 | 880 |
| 100% Modulus, MPa | 3.9 | 3.7 | 3.2 | 3.7 | 3.2 |
| Tear Strength, kN/m | 40.4 | 38.5 | 39.2 | 40.2 | 36.9 |
| Shear Viscosity (500 l/s), Pa · s | 96 | 103 | 104 | 101 | 102 |

In Table I, Examples 1 and 2 use TMPTA and 1,2-polybutadiene as co-agents. These are contrasted to Comparative Examples 1–3 which use only one co-agent in the curing system. The oil swell values exhibited in Examples 1 and 2 are surprisingly and unexpectedly superior to those in the comparative examples, thus showing the advantages of the instant invention. The compression set values are also lower, and various other properties are comparable to, if not better than, the Comparative Examples. The effect is achieved without increasing the hardness of the compound or adversely affecting the viscosity.

TABLE II

| | Example 3 | Example 4 |
|---|---|---|
| Elastomer-1, wt. % | 49.6 | — |
| Elastomer-2, wt. % | — | 49.6 |
| PP, wt. % | 20.6 | 20.6 |
| Extender oil, wt. % | 11.0 | 11.0 |
| TMPTA, wt. % | 2.0 | 2.0 |
| SPBD, wt. % | 4.0 | 4.0 |
| CaCO3, wt. % | 10.6 | 10.6 |
| Peroxide, wt. % | 0.2 | 0.2 |
| BLK Color, wt. % | 2.0 | 2.0 |
| Hardness, Shore A | 77 | 77 |
| Compression Set, % | 51 | 50 |
| Oil Swell, wt. % | 78 | 81 |
| UTS, MPa | 7.7 | 7.6 |
| 100% Modulus, MPa | 4.0 | 4.1 |
| Ult. Elong, % | 505 | 471 |
| Tear Strength, kN/m | 36.6 | 37.3 |

Table II illustrates that EPDMs containing different levels of ENB termonomer can successfully be used in this invention.

TABLE III

| Experiment No. | Example 5 | Comp. Example 4 |
|---|---|---|
| Rubber Co-cure Agents | SPBD | LV PBD |
| Co-cure Agent Type and 1,2-Vinyl Content | Syndiotactic Polybutadiene >90% vinyl | Atactic Polybutadiene 10% vinyl |
| Hardness, Shore A | 76 | 72 |
| Compression Set, % | 50 | 53 |
| Oil Swell, wt. % | 78 | 92 |
| UTS, MPa | 6.5 | 5.3 |

TABLE III-continued

| Experiment No. | Example 5 | Comp. Example 4 |
|---|---|---|
| Ult. Elong. % | 351 | 313 |
| 100% Modulus, MPa | 3.8 | 2.9 |
| Tear Strength, kN/m | 38 | 36 |

The examples in this Tables use 49.2 wt. % Elastomer-2, 20.8 wt. % PP, 12.5 wt. % extender oil, 2.0 wt. % TMPTA, 10.3 wt. % CaCO$_3$, 0.2 wt. % peroxide and 5.0 wt. % of the cited rubber co-cure agent.

Table III illustrates the differences between high vinyl polybutadiene and low vinyl polybutadiene co-agents used in combination with the TMPTA co-agent. The data in Example 5 and Comparative Example 4 show that syndiotactic polybutadiene with a high vinyl content is surprisingly and unexpectedly better than polybutadiene with low vinyl content in improving oil swell, compression set and tensile properties. Thus, butadiene-based co-agents should contain at least 50% 1,2-vinyl content to be effective in this invention.

TABLE IV

| Experiment No. | Example 6 | Comp. Example 5 | Example 7 |
|---|---|---|---|
| Co-agents | TMPTA | TMPTMA | BMI |
| Co-agent Type | Acrylate | Methacrylate | Maleimide |
| Hardness, Shore A | 81 | 77 | 80 |
| Compression Set, % | 49 | 78 | 53 |
| Oil Swell, wt. % | 82 | 174 | 75 |
| Gel Content, wt. % | >99.5 | 94.0 | >99.5 |
| UTS, MPa | 8.6 | 5.5 | 8.0 |
| Ult. Elong. % | 539 | 660 | 495 |
| 100% Modulus, MPa | 4.6 | 3.9 | 5.0 |
| Tear Strength, kN/m | 42.1 | 37.2 | 43.7 |
| Shear Viscosity (500 l/s), Pa · s | 174 | 170 | 163 |

The examples in this Tables use 48.8 wt. % Elastomer-1, 20.5 wt. % PP, 12.0 wt. % extender oil, 5.0 wt. % SPBD, 10.5 wt. % CaCO$_3$, 0.2 wt. % peroxide and 3.0 wt. % of the cited co-agent.

Table IV illustrates the significant differences between various types of co-agents used in combination with 1,2-polybutadiene. The data in Example 6 and Comparative Example 5 show that co-agents containing the acrylate group are surprisingly far superior to those containing the methacrylate group in reducing oil swell and compression set. Comparative Example 5 also illustrates that the physical properties of a partially cured elastomer are inferior to the fully cured elastomer in Example 6. (See, for example, the lower tensile strength of Comparative Example 5).

The shear viscosity data shows the surprising and unexpected result that the fully cured elastomers via peroxide curing in the present blend have good flowability, even when compared to the partially cured elastomers. Example 7 demonstrates that multifunctional maleimides containing at least two imide groups are also effective.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A reactively modified thermoplastic elastomeric blend comprising at least one propylene resin and at least one ethylene/alpha-olefin/non-conjugated diene elastomer wherein the blend is dynamically vulcanized via a curing system comprising:
    a free radical initiator;
    a first co-agent comprising diene-containing polymers with a 1,2-vinyl content greater than about 50% by weight; and
    a second co-agent comprising multifunctional acrylates containing at least two acrylate groups, multifunctional maleimides containing at least two imide groups, or mixtures thereof;
    wherein the free radical initiator and the co-agents are collectively present in an amount sufficient to provide a gel content of the elastomer of at least 97% and to provide blends of the invention having a shore A durometer hardness of at least 70 with an oil swell of less than about 90% by weight, and blends having a shore A durometer hardness of no greater than 70 with an oil swell of less than about 100% by weight.

2. The modified blend of claim 1, wherein the modified blend comprises about 10 to 70% by weight propylene resin and about 5 to 60% by weight ethylene/alpha-olefin/non-conjugated diene elastomer.

3. The modified blend of claim 1, wherein the first co-agent is present in an amount of greater than 1% to about 10 % by weight of the modified blend.

4. The modified blend of claim 3, wherein the first co-agent comprises syndiotactic 1,2-polybutadiene, atactic 1,2-polybutadiene, high vinyl solution styrene-butadiene elastomer, or mixtures thereof.

5. The modified blend of claim 4, wherein the syndiotactic 1,2-polybutadiene has a melting point of at least about 60° C.

6. The modified blend of claim 1, wherein the first co-agent or the second co-agent, or both, are each present in an amount of about 0.1 to 10% by weight of the modified blend.

7. The modified blend of claim 6, wherein the second co-agent comprises trimethylolpropane triacrylate.

8. The modified blend of claim 6, wherein the second co-agent comprises N,N'-m-phenylene dimaleimide.

9. The modified blend of claim 1, wherein the free radical initiator is present in an amount of about 0.001 to 2% by weight of the modified blend.

10. The modified blend of claim 9, wherein the free radical initiator comprises at least one organic peroxide and the blend is essentially free of moisture sensitivity.

11. The modified blend of claim 1, further comprising about 5 to 65% by weight of at least one extender oil.

12. The modified blend of claim 1, further comprising a filler present in an amount of about 0.001 to 20% by weight.

13. The modified blend of claim 1, wherein the ethylene/alpha-olefin/non-conjugated diene elastomer comprises ethylene/propylene/diene elastomer.

14. The modified blend of claim 1, wherein the ethylene/alpha-olefin/non-conjugated diene elastomer without oil has a Mooney viscosity [ML (1+4) @ 125° C.] of at least about 100.

15. The modified blend of claim 1, further comprising one or more of organic and inorganic pigments, heat stabilizers, antioxidants, ultraviolet absorbers, photostabilizers, flame retardants, antiblocking agents, foaming agents, antistatic agents or antibacterial agents, or any combination thereof.

16. An article comprising the reactively modified blend of claim 1.

17. The blend of claim 1, wherein the blend has a yellowness index of less than 30.

18. A process for preparing a dynamically vulcanized thermoplastic elastomer composition comprising:

blending a mixture of at least one polypropylene resin and at least one ethylene/alpha-olefin/non-conjugated diene elastomer at a temperature above the melting point of the at least one polypropylene resin;

adding a free radical initiator, at least one co-agent comprising diene-containing polymers with a 1,2-vinyl content greater than about 50% by weight, and at least one co-agent comprising multifunctional acrylates containing at least two acrylate groups or multifunctional maleimides containing at least two imide groups; and then mixing and shearing the blend sufficiently at a temperature to effect crosslink formation such that the elastomer has a gel content of at least 97%, wherein the free radical initiator and the co-agents are collectively present in an amount sufficient to provide blends of the invention having a shore A durometer hardness of at least 70 with an oil swell of less than about 90% by weight, and blends having a shore A durometer hardness of no greater than 70 with an oil swell of less than about 100% by weight.

19. A process according to claim 18, wherein the mixing device comprises a twin screw extruder.

20. A thermoplastic elastomer curing system comprising:

a free radical initiator comprising at least one organic peroxide;

a first co-agent comprising diene-containing polymers with a 1,2-vinyl content greater than about 50% by weight; and a second co-agent comprising multifunctional acrylates containing at least two acrylate groups, multifunctional maleimides containing at least two imide groups, or mixtures thereof;

wherein the curing system includes sufficient amounts of the free radical initiator and the co-agents, when combined with at least one polypropylene resin and at least one additional ethylene-containing material, to form a reactively modified thermoplastic elastomer blend having a gel content of the elastomer of at least 97% and to provide blends of the invention having a shore A durometer hardness of at least 70 with an oil swell of less than about 90% by weight, and blends having a shore A durometer hardness of no greater than 70 with an oil swell of less than about 100% by weight.

21. A thermoplastic elastomer-based reaction mixture comprising:

at least one propylene resin and at least one ethylene/alpha-olefin/non-conjugated diene elastomer; and the thermoplastic elastomer curing system of claim 20.

22. The modified blend of claim 1, wherein the curing system is at least substantially free of TMPTMA-containing co-agents.

23. The modified blend of claim 1, wherein the curing system is at least substantially free of methacrylate-containing co-agents.

* * * * *